I. TOWNSEND.
TRACTION WHEEL.

No. 181,745.        Patented Aug. 29, 1876.

WITNESSES:
Jas. F. Duhamel,
Thomas Byrne.

INVENTOR:
Israil Townsend
PER
H. S. Abbot
ATTORNEY.

UNITED STATES PATENT OFFICE.

ISRAEL TOWNSEND, OF CAPEVILLE, VIRGINIA.

IMPROVEMENT IN TRACTION-WHEELS.

Specification forming part of Letters Patent No. 181,745, dated August 29, 1876; application filed March 15, 1876.

*To all whom it may concern:*

Be it known that I, ISRAEL TOWNSEND, of Capeville, in the county of Northampton and State of Virginia, have invented certain new and useful Improvements in Traction-Engines, of which the following is a specification:

My invention relates to traction-engines for steam-plows, road-wagons, and other purposes; and it consists, essentially, in the devices for holding the endless track down onto the ground in advance of the driving-wheels, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
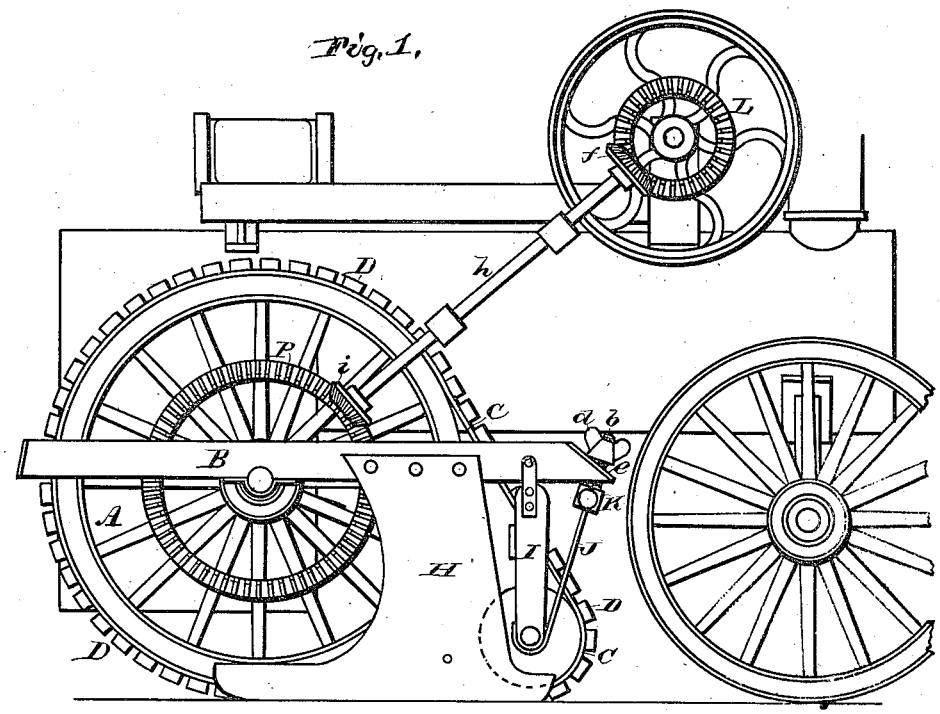
Figure 2:
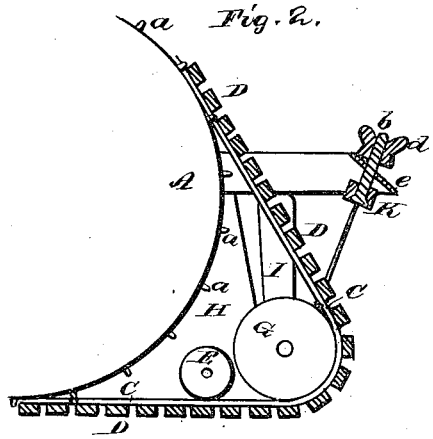

Figure 1 is a side elevation of a traction-engine embodying my invention. Fig. 2 is a section of the driving-wheel with track and devices connected thereto.

A represents the driving-wheel of a traction-engine of any ordinary construction, the wheel being mounted on an axle in a frame, B. From the rim or tread of the wheel project a series of pins or cogs, $a\,a$, at suitable equal distances apart, which take into the endless track. This track consists of an endless belt, C, with cross-bars D D fastened on its outer side at any suitable interval, as shown. This track passes around the wheel A and around two rollers, E and G, arranged in front of said wheel. The roller E has its journal-bearings in metal shoes H H, attached to, and depending from, the frame B, one on each side of the wheel, and said roller answers simply the purpose of holding the track down level in front of the wheel. The roller G is situated in front of the roller E, and has its bearings in two arms, I I, pivoted to the sides of the frame B. The lower ends of these arms are, by rods or braces J J, connected with a cross-bar, K, at the front end of the frame B. This cross-bar is provided with a bolt, $b$, that passes through a plate or bar, $e$, fastened to the frame, and a thumb-nut, $d$, is screwed on the end of said bolt, whereby the cross-bar K may raised or lowered as required, to properly tighten the endless track C D.

The wheel A is propelled from the engine by means of a gear-wheel, L, on the engine-shaft, which meshes with a pinion, $f$, on a shaft, $h$, and said shaft has a pinion, $i$, on its lower end, which meshes with a cog-wheel, P, secured to the side of the driving-wheel A, as shown.

By means of the rollers E and G, as described, the endless track is held at the proper tension and laid down level in front of the wheel A, which wheel, as it moves, takes up and moves the track.

Having thus fully described my invention, what I claim as new, and desire to secure by Letters Patent, is—

1. The combination, with the wheel A and endless track C D, of the stationary rotating roller E, and the adjustable roller G, both arranged in front of the wheel, substantially as and for the purposes herein set forth.

2. The combination of the roller G, pivoted arms I I, brace-rods J J, cross-bar K, bolt $b$, and nut $d$, all substantially as and for the purposes herein set forth.

In testimony that I claim the foregoing as my own I affix my signature in presence of two witnesses.

ISRAEL TOWNSEND.

Witnesses:
 RICHARD W. NOTTINGHAM,
 EDWD. M. HALLETT.